United States Patent
Wang

(10) Patent No.: US 6,518,738 B1
(45) Date of Patent: Feb. 11, 2003

(54) SWITCHING REGULATOR CONTROL CIRCUIT WITH PROACTIVE TRANSIENT RESPONSE

(75) Inventor: Xintao Wang, Warwick, RI (US)

(73) Assignee: Semiconductor Components Industries, LLC, Phoenix, AZ (US)

(*) Notice: Subject to any disclaimer, the term of this patent is extended or adjusted under 35 U.S.C. 154(b) by 0 days.

(21) Appl. No.: 09/537,319

(22) Filed: Mar. 29, 2000

(51) Int. Cl.[7] ................................................. G05F 1/56
(52) U.S. Cl. ............................................ 323/284; 323/272
(58) Field of Search ................................ 323/272, 282, 323/284, 288

(56) References Cited

U.S. PATENT DOCUMENTS

| | | | |
|---|---|---|---|
| 5,371,666 A | 12/1994 | Miller | 363/98 |
| 5,770,940 A | 6/1998 | Goder | 323/282 |
| 5,949,229 A | 9/1999 | Choi et al. | 323/320 |
| 5,995,910 A | 9/1999 | Levin et al. | 323/266 X |
| 6,130,526 A * | 10/2000 | Yang et al. | 323/272 |

* cited by examiner

Primary Examiner—Jessica Han
(74) Attorney, Agent, or Firm—Robert D. Atkins; Michael T. Wallace

(57) ABSTRACT

A switching regulator control circuit provided with a summer to add the error signal an error amplifier with a target signal. The output of the summer is provided to a comparator which receives its other input from a ramp signal. In one embodiment, the reference voltage is modifiable and the target signal is proportional to the modifiable reference voltage. In another embodiment, the switching regulator is controlled by current mode control and the target signal is proportional to the load current demanded by the switching regulator's load.

23 Claims, 4 Drawing Sheets

SWITCHING REGULATOR CONTROL CIRCUIT WITH PROACTIVE TRANSIENT RESPONSE

BACKGROUND OF THE INVENTION

The present invention relates to switching regulators. Switching regulators have long been used for providing a regulated voltage. Various power supply designs incorporating switching regulators have been developed. Various attempts at achieving fast transient response to transients in the input voltage or in the load have been made. A discussion of the art of switching regulators can be found in U.S. Pat. No. 5,770,940 (Goder). The full disclosure of the Goder patent is hereby incorporated herein by reference. The Goder patent itself provides one of the most recent designs for providing fast transient response. The Goder circuit includes a fast feedback loop and a slow feedback loop to provide a highly responsive switching stable switching regulator.

Power supplies are now being used in great quantities for microprocessors and other computer equipment. This equipment is placing greater and greater demands on power supplies. A load can rise instantly from a minimum to a maximum level when a system wakes up from a power down mode. The load current can also experience an abrupt drop when the system reduces the power consumption. To keep the output voltage tightly regulated during this transition has been a difficult challenge. Another transient condition which modern computer technology is beginning to impose on power supplies is the ability to respond when the targeted voltage changes. For example, output computers will be designed in which the supply voltage will vary depending upon the supply source, such as between batteries or power line. The computer will require that the power supply promptly re-regulate the supply voltage when the supply source is switched giving a new target voltage.

The existing switching regulators use an error amplifier to achieve output regulation. Feedback voltage from the output is compared with a reference voltage to generate an error signal. The error signal is then digitized through use of a pulse width modulator comparator to modulate the switching devices in a power supply. The on and off ratio of the switching devices then controls the power flow for voltage regulation. Since the error amplifier has limited bandwidth, the error signal inevitably has a delay relative to a deviation in the output voltage, or in the reference voltage. Increasing the bandwidth on the error amplifier tends to cause ringing on the error signal and thus on the output voltage. Such a system would be unstable.

SUMMARY OF THE INVENTION

In accordance with embodiments of the present invention, the output of an error amplifier is summed with a target signal. Examples of target signals include a reference voltage or a targeted load current. The sum is fed into the comparator for comparison with a ramp signal. In an embodiment of the invention, the ramp signal is derived from the ripple on the output voltage. The comparator produces a control signal to control the switching of the switching regulator.

In accordance with an embodiment of the invention adapted for the dual feedback switching regulator control described by Goder, an error amplifier receives a signal proportional to an output voltage of the switching regulator and has a reference input connected to a modifiable reference voltage. The reference voltage may be changed, for instance, according to the specifications for a new notebook computer, if a supply is changed from a battery to a power line. The error signal from the error amplifier and a signal proportional to the modifiable reference voltage are summed. The control signal is produced by a comparator having an input coupled to the summer and an input connected to receive a ramp signal derived from the output voltage of the switching regulator.

In a current mode control embodiment of the invention, the error amplifier receives a signal proportional to the output voltage of the switching regulator and has a reference voltage input. The switching regulator provides current through an inductor. A current sensor provides a current sense signal proportional to the load current of the switching regulator. The load current sense signal is summed with the output of the error amplifier. A comparator having an input coupled to the summer and an input connected to receive a ramp signal derived from the inductor current of the switching regulator produces a control signal for the switching regulator.

A method of the invention for fast and slow feedback control includes generating a periodic ON and OFF control signal. The signal proportional to the output voltage of the switching regulator is compared with a modifiable reference voltage to develop an error signal. The error signal and the signal proportional to the modifiable reference voltage are summed to produce a voltage sum signal. The voltage sum signal is compared with a signal derived from the output voltage to adjust the duty cycle of the periodic ON and OFF control signal. The ON and OFF control signal causes the switch to open in one state and close in response to the other state.

Embodiments of the invention advantageously respond quickly to changes in the targeted voltage or current. Other objects and advantages of the invention shall become apparent during the following description of the presently preferred embodiment of the invention taken in conjunction with the drawings.

DETAILED DESCRIPTION OF THE PREFERRED EMBODIMENTS

Figure 1:
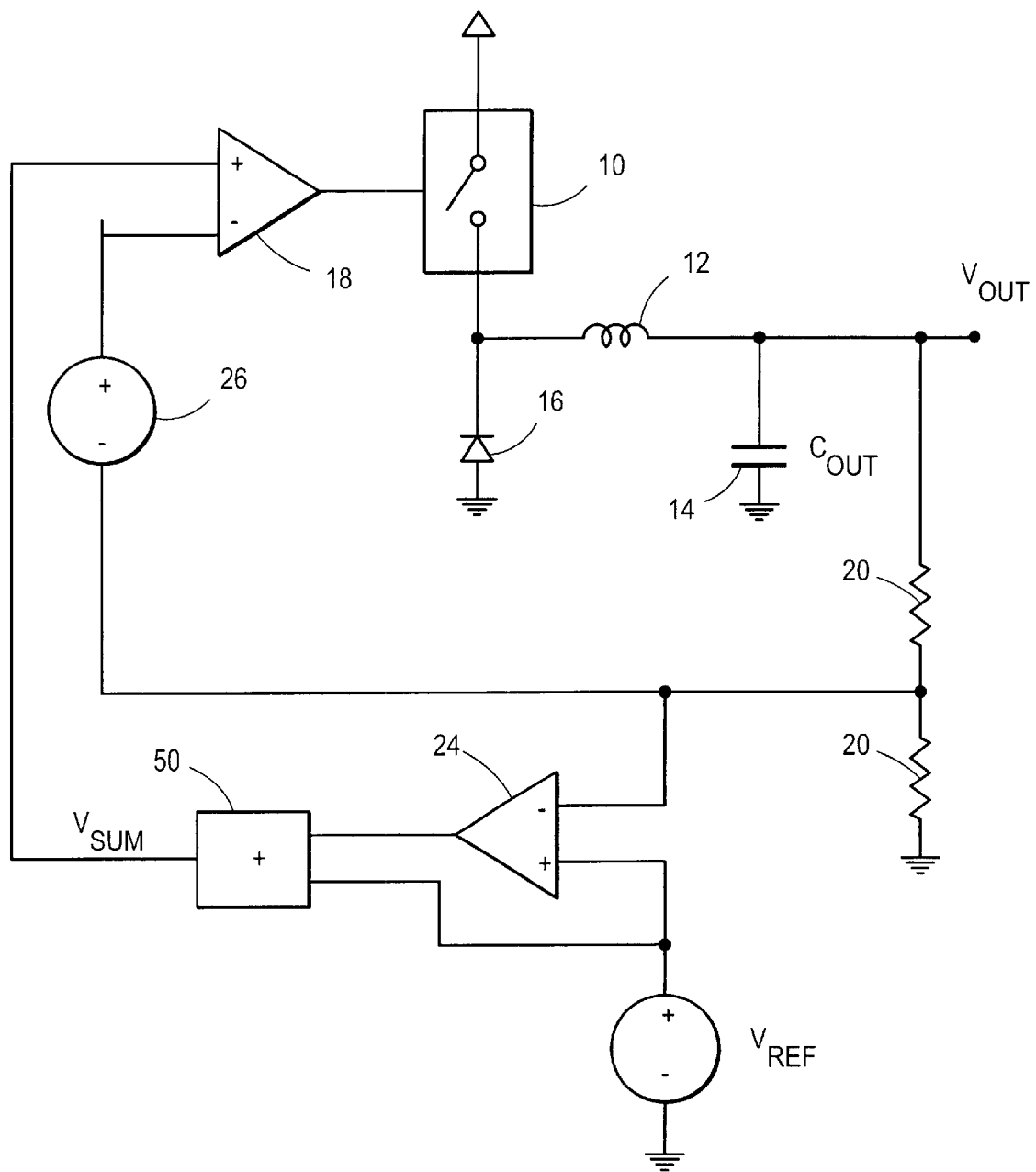
FIG. 1 is a schematic diagram of a switching regulator controlled by an embodiment of the invention.

Referring now to FIG. 1, a switching regulator includes a switch 10 and an LC circuit, an inductor 12 and a capacitor 14. The switch 10 includes an input which receives an input voltage, an output and a control line. The control line receives a signal for determining whether the switch is open or closed. A free-wheeling diode 16 provides a current path for the inductor 12 when the switch 10 is open. This simple variant of a switching regulator is used to conveniently illustrate the control circuit of the present invention. Other switching regulator power supply designs may be substituted for the one given in FIG. 1. For example, the free-wheeling diode 16 may be replaced by a second switch. In accordance with other embodiments, the switching regulator may be a forward mode regulator where the switch controls voltage across a primary winding of a transformer and the control signals are developed from the secondary winding.

A switching regulator control circuit of the type described herein feeds a ramp signal to a comparator 18. In the circuit of FIG. 1, the ramp signal and comparator 18 form a relatively fast feedback path to the switch 10. The ramp signal is derived from the output voltage Vout. A resistor divider 20 may be inserted in the relatively fast feedback line to divide down the size of the voltage signal. When as shown in FIG. 1, the ramp signal is a voltage signal, it is proportional to the output voltage of the switching regulator. Ramp refers to the ripple in the voltage. The ramp signal may be further DC shifted by a level shifter 26. Further in the embodiment of FIG. 1, the comparator 18 has built-in hysteresis. The effect of hysteresis is described in the Goder patent which has been incorporated herein by reference. A second relatively slower feedback path supplies a signal proportional to the output voltage of the switching regulator to an error amplifier 24. The resistor divider 20 divides down the size of the output voltage signal into the error amplifier 24. The other input to the error amplifier is a reference voltage (Vref). The reference voltage is the target voltage to which the switching regulator attempts to regulate the output voltage.

In accordance with an embodiment of the present invention, a summer 50 adds the error signal output from the error amplifier 24 to a target signal. In this case, the target signal is generated from the reference voltage. In the case where the reference voltage is modifiable, the summer 50 permits the switching regulator control circuit to adapt quickly to a change in the reference voltage. A resistor divider may be included between the reference voltage and the summer 50 to set the target signal at an appropriate level proportional to the reference voltage. In the preferred embodiment, the target signal equals the reference voltage. Typically, the reference voltage is set by a microprocessor. The microprocessor will provide a binary code to a digital to analog converter. The digital to analog converter changes the binary code to an analog reference voltage. The summer 50 enables the switching regulator control circuit to adapt quickly to a change in the reference voltage.

The hysteresis of the comparator 18 produces a peak-to-peak in the output voltage. The ripple in the output voltage signal acts as a ramp signal into the comparator 18. The ramp signal is compared with the voltage sum signal from summer 50 to produce a control signal for periodically switching the switch 10 on or off.

Figure 2:
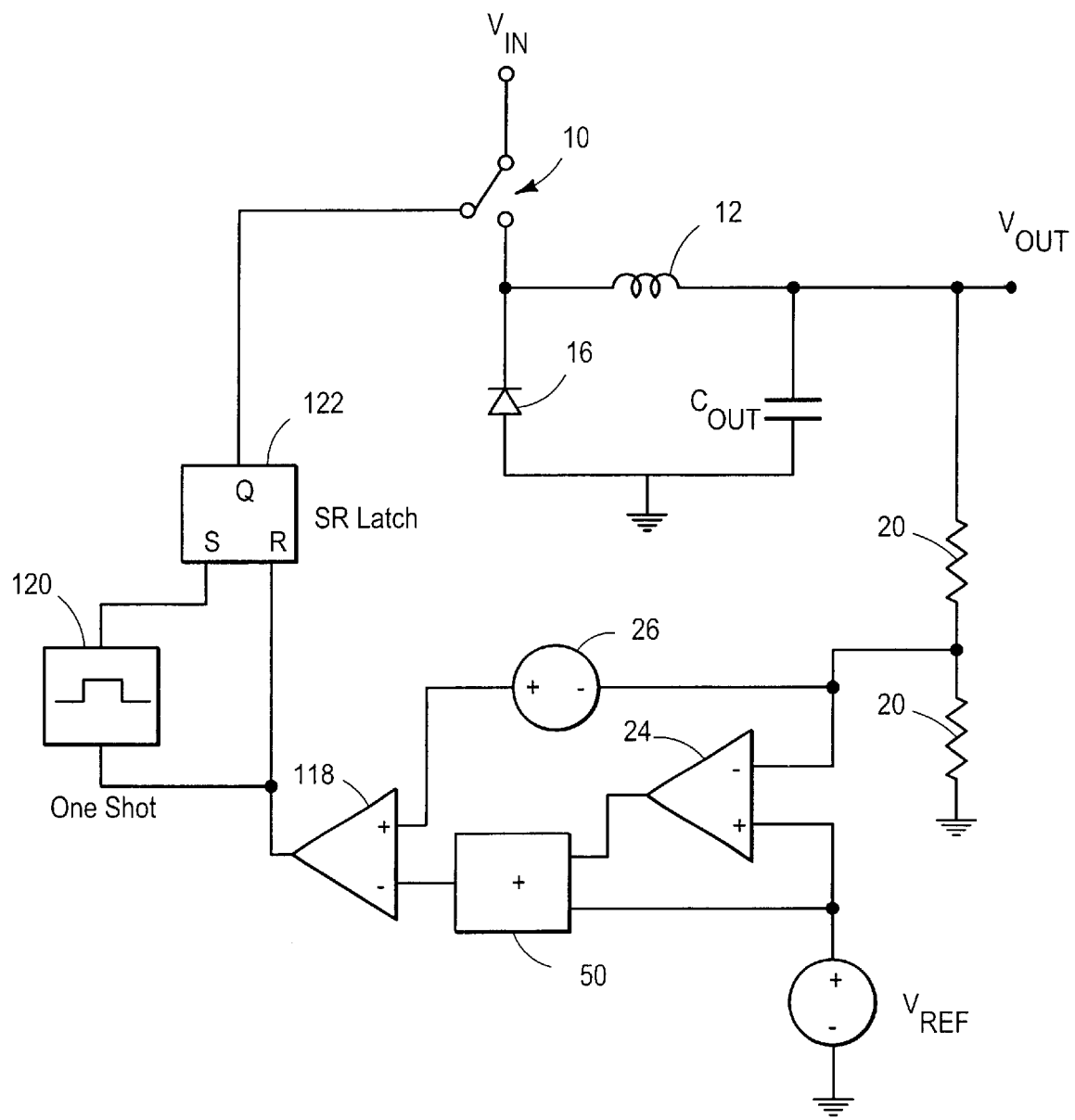
FIG. 2 is a schematic circuit diagram of a switching regulator controlled by an alternate embodiment of the invention.

In accordance with embodiments of the present invention, the voltage summer 50 may be incorporated into a variety of switching regulator control circuits that include a modifiable reference voltage. FIG. 2 is a constant off-time embodiment of a switching regulator control circuit. In this embodiment, the comparator 118 need not include hysteresis. The comparator 118 produces a control signal that operates a latch 122 and a one shot 120. The one shot 120 serves as a timing reference by establishing a constant off time. The control signal from the comparator 118 periodically resets the latch 122 and initiates the one shot timer. After a constant off-time, the one shot 120 activates the set input to the latch 122. Thus, the latch delivers an ON and OFF control signal to the switch responsive to the control signal from comparator 118 and having a constant off-time.

The overall circuit operation is similar to the embodiment of FIG. 1. The feedback signal into the error amplifier 24 is proportional to the output voltage of the switching regulator. It is compared at the error amplifier 24 to a target signal proportional to a modifiable reference voltage. The error signal from the error amplifier 24 is provided to a summer 50 where it is summed with a signal proportional to the modifiable reference voltage. The voltage sum signal from the summer 50 is compared with a feedback signal derived from the output voltage in the comparator 118. This feedback signal provides a ramp due to the output voltage ripple. The summer 50 advantageously provides a quick response to changes in the reference voltage. The output of the comparator 118 adjusts the duty cycle of the periodic ON and OFF control signal into the switch 10.

Figure 3:
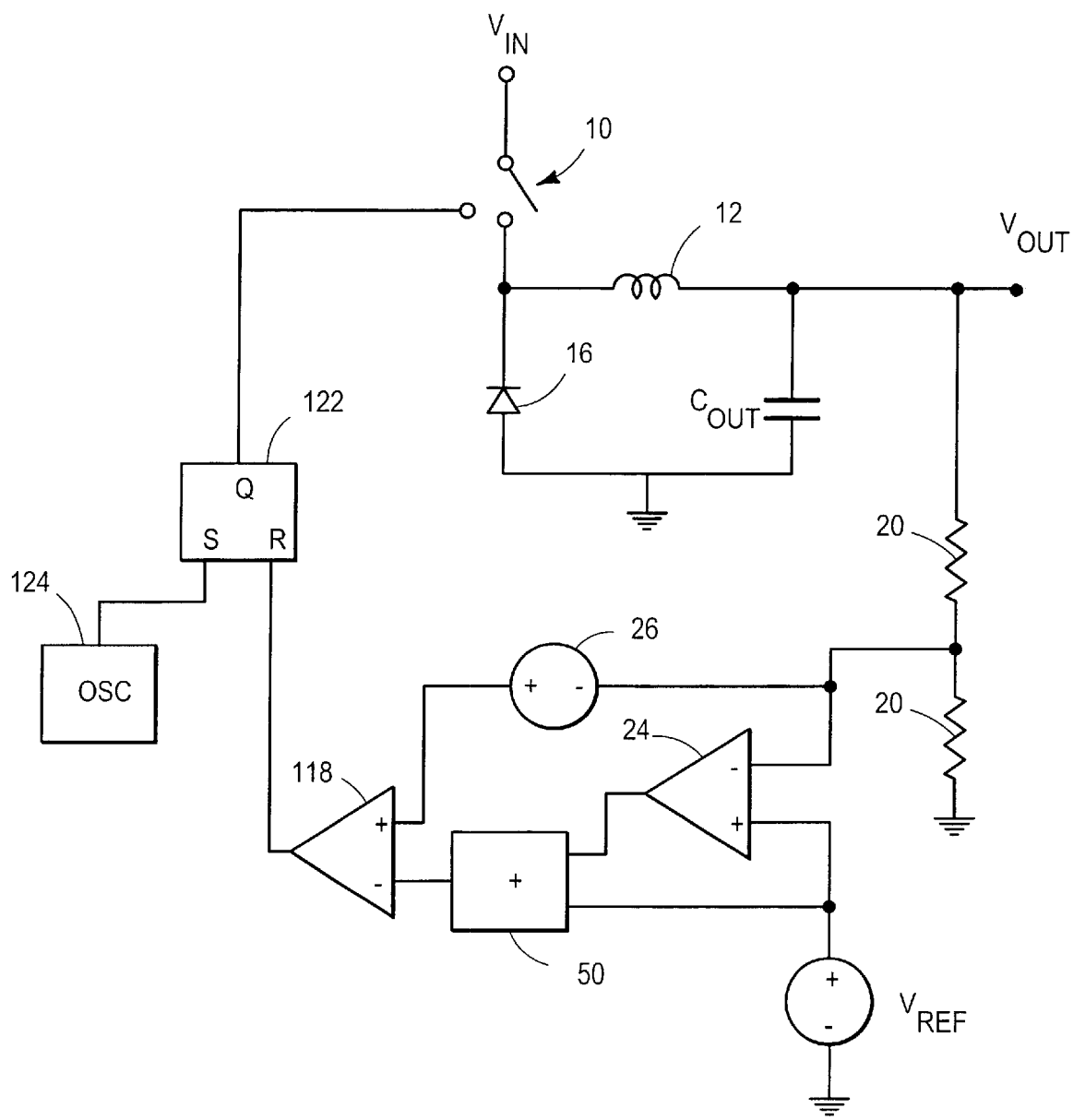
FIG. 3 is a schematic circuit diagram of an alternative switching regulator controlled by an embodiment of the invention.

FIG. 3 is a constant frequency embodiment of a switching regulator control circuit. More embodiments may, for example, be found in the Goder patent. In FIG. 3, the control signal from comparator 118 is fed into a reset input of an SR latch 122. An oscillator 124, at a constant frequency, activates the set input of the latch 122. At regular intervals, the ON and OFF control signal to the switch 10 gets turned on by the oscillator 124 and the duty cycle of the signal is adjusted by the control signal from the comparator 118.

Figure 4:
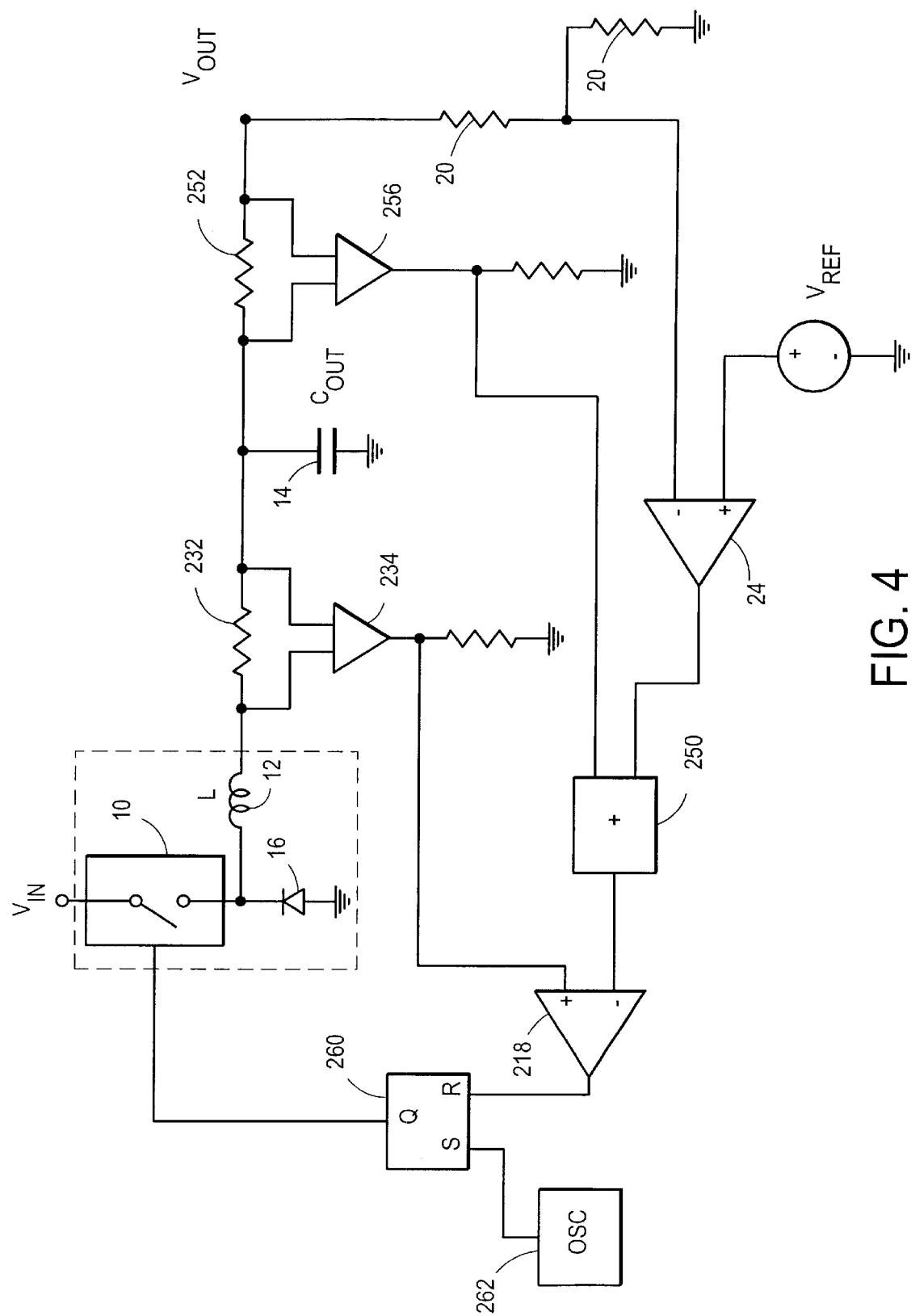
FIG. 4 is a schematic circuit diagram of a switching regulator controlled by current mode control in accordance with an alternate embodiment of the invention.

Referring now to FIG. 4, it is shown that the invention may be used in a current mode control embodiment. Here, the target signal is proportional to the load current demanded by the switching regulator's load. The load current is measured with a sense resistor 252 or other convenient means such as a current transformer. A current sense amplifier 256 produces the target signal which is fed into a summer 250. As is conventional for current mode control, error amplifier 24 receives a signal proportional to the output voltage at one input and a reference voltage at a reference input. The error amplifier 24 produces an error signal which in accordance with an embodiment of the invention, is also fed into the summer 250. A comparator 218 has an input to receive the output from the summer 250. The other input of the comparator 218 receives the ramp signal. In the case of current mode control, the ramp signal is derived from the inductor current. The inductor current can be detected at any of a variety of locations including either end of the inductor or at switch 10. A current sense resistor 232, the inductor 12 itself or other conventional means for sensing current provides a signal proportional to the inductor current to a current sense amplifier 234. Preferably, the gain of current sense resistor 232 an current sense amplifier 234 is equal to the gain of current sensor resistor 252 and amplifier 256. The comparator 218 compares the current sense ramp signal from the inductor 12 with the sum signal from the summer 250. Comparator 218 produces a control signal which in the embodiment of FIG. 4 is fed into a reset pin of an SR flip-flop 260. An oscillator 262 is connected to the set input. The oscillator 262 provides a set frequency to the flip-flop 260. The output of the flip-flop is a periodic ON and OFF signal for controlling the switch 10. The control signal from comparator 218 adjusts the duty cycle of the on-and-off signal. Other embodiments of current mode control may use other conventional means for driving the switch 10. By providing a signal proportional to load current to the summer 250, the circuit of FIG. 3 is adapted to more quickly respond to load transients.

It should be understood that various changes and modifications to the preferred embodiments described above will be apparent to those skilled in the art. For example, the use of the summer to add a target signal with the error signal may be used with a wide variety of switching regulators all of which, of course, have not been illustrated in the present application. These and other changes can be made without departing from the spirit and scope of the invention and without diminishing its attendant advantages. It is therefore intended that such changes and modifications be covered by the following claims.

I claim:

1. A switching regulator control circuit comprising:
   an error amplifier having an input for receiving a signal proportional to an output voltage of the switching regulator and having a reference input connected to a modifiable reference voltage, said error amplifier producing an error signal at its output;
   a summer having inputs coupled to the output of said error amplifier and to a signal proportional to the modifiable reference voltage; and
   a comparator having a first input coupled to an output of said summer and a second input connected to receive a ramp signal derived from the output voltage of the switching regulator to produce a control signal.

2. The switching regulator control circuit of claim 1 wherein the signal proportional to the modifiable reference voltage is equal to the modifiable reference voltage.

3. The switching regulator control circuit of claim 2 further comprising a level shifter connected to receive a signal proportional to the output voltage to produce the ramp signal.

4. The switching regulator control circuit of claim 1 wherein said comparator is a hysteresis comparator.

5. The switching regulator control circuit of claim 1 wherein the control signal determines when to provide an OFF signal and further comprising an oscillator for providing an ON signal at a constant frequency.

6. The switching regulator control circuit of claim 1 wherein the control signal determines when to switch off a switching regulator switch and further comprising a one shot that switches the switching regulator switch on after a constant off time.

7. A switching regulator control circuit for controlling an output voltage of a switching regulator, said control circuit comprising:
   an error amplifier having an input for receiving a signal proportional to the output voltage and a reference input connected to a reference voltage, said error amplifier producing an error signal;
   a summer connected so as to add the error signal to a target signal proportional to said reference voltage; and
   a comparator having a first input coupled to an output of said summer and a second input connected to receive a ramp signal derived from the output voltage to produce a control signal that provides, due to the target signal, a response in said switching regulator to changes in the reference voltage.

8. The switching regulator control circuit of claim 7 wherein the target signal is equal to said reference voltage.

9. The switching regulator control circuit of claim 8 further comprising a level shifter connected to receive a signal proportional to the output voltage to produce the ramp signal.

10. The switching regulator control circuit of claim 7 wherein said comparator is a hysteresis comparator.

11. The switching regulator control circuit of claim 7 wherein the control signal determines when to provide an OFF signal and further comprising an oscillator for providing an ON signal at a constant frequency.

12. The switching regulator control circuit of claim 7 wherein the control signal determines when to switch off a switching regulator switch and further comprising a one shot that switches the switching regulator switch on after a constant off time.

13. A switching regulator control circuit for controlling an output voltage of a switching regulator that provides current through an inductor, said control circuit comprising:
   an error amplifier having an input for receiving a signal proportional to the output voltage and a reference input connected to a reference voltage, said error amplifier producing an error signal;
   a summer connected so as to add the error signal to a target signal proportional to a load current; and
   a comparator having a first input coupled to said summer and a second input connected to receive a ramp signal derived from the inductor current to produce a control signal.

14. The switching regulator control circuit of claim 13 further comprising means for sensing the inductor current and producing the ramp signal.

15. A current mode control circuit comprising:
   an error amplifier having an input for receiving a signal proportional to an output voltage of a switching regulator that provides current through an inductor and said error amplifier having a reference input connected to a reference voltage;
   a current sensor for providing a load current sense signal proportional to load current from said switching regulator;
   a summer having a first input coupled to the output of said error amplifier and a second input coupled to receive the load current sense signal; and
   a comparator having a first input coupled to said summer and a second input connected to receive a ramp signal derived from the inductor current of the switching regulator to produce a control signal.

16. The current mode control circuit of claim 15 further comprising a memory storage device having a first input coupled to receive the control signal and a second input coupled to receive an oscillator signal.

17. The current mode control circuit of claim 16 wherein the memory storage device includes a flip-flop.

18. A method for controlling a switching regulator comprising:
   comparing a signal proportional to an output voltage of the switching regulator with a modifiable reference voltage to develop an error signal;
   summing the error signal and a signal proportional to the modifiable reference voltage to produce a voltage sum signal; and
   comparing the voltage sum signal with a signal derived from the output voltage to generate a control signal for controlling the switching regulator.

19. The method of claim 18 further comprising level shifting the signal proportional to the output voltage to produce the signal derived from the output voltage.

20. A method for controlling a switching regulator that provides output current through an inductor comprising:
   comparing a signal proportional to an output voltage of the switching regulator with a reference voltage to develop an error signal;
   summing the error signal and a signal proportional to load current from the switching regulator to produce a sum signal; and
   comparing the sum signal with a signal derived from the output current to generate a control signal for controlling the switching regulator.

21. The method of claim 20 wherein comparing the signal proportional to the output voltage of the switching regulator with the reference voltage to develop the error signal further includes modifying the reference voltage to change the error signal.

22. A method for controlling a switching regulator comprising:

generating a periodic ON and OFF control signal;

comparing a signal proportional to an output voltage of the switching regulator with a modifiable reference voltage to develop an error signal;

summing the error signal and a signal proportional to the modifiable reference voltage to produce a voltage sum signal; and comparing the voltage sum signal with a signal derived from the output voltage to adjust the duty cycle of the periodic ON and OFF control signal and to provide a response in said switching regulator to a change in the modifiable reference voltage.

23. The method of claim 22 wherein generating a periodic ON and OFF control signal comprises:

setting a memory state of a memory storage device to generate the ON signal; and resetting the memory state to generate the OFF signal.

* * * * *